(12) United States Patent
Barnhart

(10) Patent No.: US 6,463,710 B1
(45) Date of Patent: Oct. 15, 2002

(54) LEDGER BRACKET AND METHOD

(76) Inventor: Michael Barnhart, 8513 Cumulus Way, Orangevale, CA (US) 95662

( * ) Notice: Subject to any disclaimer, the term of this patent is extended or adjusted under 35 U.S.C. 154(b) by 0 days.

(21) Appl. No.: 09/499,902

(22) Filed: Feb. 8, 2000

(51) Int. Cl.[7] ................................................ E04B 1/38
(52) U.S. Cl. .............................. 52/698; 52/702; 249/40; 249/250; 403/232.1
(58) Field of Search ...................... 52/27, 702; 248/235, 248/250

(56) References Cited

U.S. PATENT DOCUMENTS

| | | |
|---|---|---|
| 120,301 A | 11/1871 | Mason |
| 421,746 A | 2/1890 | Mooney |
| 2,064,984 A | 12/1936 | Marsh |
| 2,491,638 A | 12/1949 | Ayers |
| 2,762,130 A | 9/1956 | Olson |
| 3,348,801 A | 10/1967 | Deason |
| 3,776,501 A | 12/1973 | Loftin |
| 3,815,862 A * | 6/1974 | Williams ..................... 249/40 |
| 3,972,168 A | 8/1976 | Allen |
| 4,070,013 A | 1/1978 | Sickler |
| 4,089,141 A | 5/1978 | Heroux |
| 4,158,455 A | 6/1979 | Brown |
| 4,353,664 A | 10/1982 | Gilb |
| 4,473,100 A | 9/1984 | Wheeler |
| 4,584,813 A | 4/1986 | Hudson |
| 4,733,843 A * | 3/1988 | Bessinger ..................... 248/250 |
| 4,736,918 A * | 4/1988 | Bessinger ..................... 248/250 |
| 4,836,517 A | 6/1989 | Vossler |
| 4,937,950 A | 7/1990 | Farnworth |
| 5,058,358 A | 10/1991 | Stratton |
| 5,092,096 A | 3/1992 | Cornell |
| 5,192,059 A | 3/1993 | Silver |
| 5,228,667 A | 7/1993 | Bridegum |
| 5,371,994 A | 12/1994 | Waters |
| 5,489,088 A | 2/1996 | Warter |
| 5,564,236 A | 10/1996 | McKinney et al. |
| 5,564,248 A * | 10/1996 | Callies ........................ 52/702 |
| 5,603,580 A * | 2/1997 | Leek et al. ............... 403/232.1 |
| 5,658,113 A | 8/1997 | Lazo |
| 5,673,903 A | 10/1997 | Lewis |
| 5,746,421 A | 5/1998 | Bowerman |
| 5,768,830 A | 6/1998 | Kelly |

* cited by examiner

Primary Examiner—Carl D. Friedman
Assistant Examiner—Steve Varner
(74) Attorney, Agent, or Firm—Bernhard Kreten

(57) ABSTRACT

A bracket support for a ledger in order to secure the ledger to a wall in which a plate is temporarily attached to the wall, the plate including a shelf upon which the ledger is supported and a clamp removably presses the ledger to the wall until the ledger can be anchored to the wall by means of anchor bolts and grout.

18 Claims, 4 Drawing Sheets

LEDGER BRACKET AND METHOD

FIELD OF THE INVENTION

The following invention is generally related to instrumentalities and methodologies in the construction industry. More specifically, the instant invention is directed to the installation of ledgers to walls so that the ledgers can subsequently be used in supporting other structures, such as joists for floors thereon.

BACKGROUND OF THE INVENTION

Commercial construction is a very competitive business, since all things being equal, a contract is awarded for a construction project to the lowest bidder. This type of downward cost pressure induces the need for efficiency both in the deployment and choice of construction commodities. One present example of inefficiency involves the installation of a ledger on a wall.

A ledger is a beam which is affixed to a side face of a wall which subsequently serves as a ledge or support for other beams (such as joists) disposed thereon. Typically, a ledger is formed from a multiplicity of beams placed in end to end relationship and oriented to circumscribe an inner periphery of a wall to provide a ledge upon which other materials can be supported.

To install a ledger, it has been the practice to elevate a ledger to the desired height and adjacent the wall by means of shoring which typically consist of vertically extending pieces of lumber upon which the ledger can rest while small holes are drilled above and below the ledger. Tie wire is then threaded through the holes and twisted together around the ledger to hold it against the wall so that anchor bolts can subsequently pass through pre-aligned holes in both the wall and the ledger for subsequent fastening. Ultimately, the anchor bolts are fixed in the wall with a cementitious material. It is clear that this type of ledger installation, particularly when contrasted with the instant invention, is quite cumbersome.

A second common technique is to initially locate a template on the wall by means of small projections which extend from the template and project into predrilled holes on the wall. Next anchor bolts are oriented to extend through the wall in accordance with hole patterns on the template. Once the anchor bolts are fixed in the wall, the template is removed and a ledger addresses the template so that holes are formed therethrough which correspond to the locations of the anchor bolts which now are fixed on the wall. The holes placed in the ledger then are aligned with the anchor bolts and the ledger is affixed to the wall. This technique as well as the previously discussed technique can be particularly cumbersome, especially when a long ledger is to be used.

The following prior art reflects the state of the art of which applicant is aware and is included herewith to discharge applicant's acknowledged duty to disclose relevant prior art. It is stipulated, however, that none of these references teach singly nor render obvious when considered in any conceivable combination the nexus of the instant invention as disclosed in greater detail hereinafter and as particularly claimed.

| PATENT NO. | ISSUE DATE | INVENTOR |
|---|---|---|
| 120,301 | October 24, 1871 | Mason |
| 421,746 | February 18, 1890 | Mooney |
| 2,064,984 | December 22, 1936 | Marsh |
| 2,491,638 | December 20, 1949 | Ayers |
| 2,762,130 | September 11, 1956 | Olson |
| 3,348,801 | October 24, 1967 | Deason |
| 3,776,501 | December 4, 1973 | Loftin |
| 3,972,168 | August 3, 1976 | Allen |
| 4,070,013 | January 24, 1978 | Sickler |
| 4,089,141 | May 16, 1978 | Heroux |
| 4,158,455 | June 19, 1979 | Brown |
| 4,353,664 | October 12, 1982 | Gilb |
| 4,473,100 | September 25, 1984 | Wheeler |
| 4,584,813 | April 29, 1986 | Hudson |
| 4,836,517 | June 6, 1989 | Vossler |
| 4,937,950 | July 3, 1990 | Farnworth |
| 5,058,358 | October 22, 1991 | Stratton |
| 5,092,096 | March 3, 1992 | Cornell |
| 5,192,059 | March 9, 1993 | Silver |
| 5,228,667 | July 20, 1993 | Bridegum |
| 5,371,994 | December 13, 1994 | Waters |
| 5,489,088 | February 6, 1996 | Warter |
| 5,564,236 | October 15, 1996 | McKinney, et al. |
| 5,658,113 | August 19, 1997 | Lazo |
| 5,673,903 | October 7, 1997 | Lewis |
| 5,746,421 | May 5, 1998 | Bowerman |
| 5,768,830 | June 23, 1998 | Kelly |

The patent to Hudson teaches the use of a hanger which includes a generally U-shaped bracket member (32) and an anchor member (34). The U-shaped hanger member (32) includes a rear leg (36), bight section (38), and front leg (40). The front and rear legs (40) and (36) are spaced apart a distance to accommodate the particular size of wooden beam or timber. Hudson requires that the hanger remain permanently attached to the ledger.

The patent to Waters teaches a sheet installation apparatus which includes a set of four ceiling-mounted sheet material support assemblies. Each sheet material support assembly includes a ceiling mounting portion and a sheet retaining portion. The ceiling mounting portion includes a channel for receiving a fastener for attaching to a fixed object in a ceiling. The edge of the sheet material is wedged between the sloped upper surface and the ceiling. The channel is oriented in the ceiling mounting portion such that the sheet material support assembly is capable of selectively rotating around the fastener to and from two positions. Waters requires that the entire weight of the panel be carried on the pivoting section.

The patent to McKinney, et al., teaches a deadman and methods of use for temporally holding panel material in position while the material is being fastened to a supporting structure, such as in wall and ceiling construction. McKinney, of course, does not lend itself to utilization with different size ledgers.

The patent to Allen teaches a clamping and fastening unit which includes a combination clamping and fastening member which in use is disposed outwardly of the masonry or concrete wall and is adapted to be clamped against and to be fastened to the wood framing structure. Allen requires that the device be held only where the mortar joints pass though adjacent blocks of cinder blocks. Thus, if the ledger needs to be oriented on a slope or curve, this system is difficult to deploy.

The other prior art listed above but not specifically described further catalog the prior art of which the applicant is aware. These references diverge even more starkly from the references specifically distinguished above.

SUMMARY OF THE INVENTION

The instant invention is distinguished over the known prior art in a multiplicity of ways. For example, to install a ledger using the present invention, at least one and preferably several devices according to the present invention are deployed along a wall that it to receive the ledger. First, a plate having a shelf thereon is temporarily attached to the wall. The shelf supports a ledger and is enhanced by means of a clamping backing device pivotally attached to the device and deployable on a face of the ledger remote from the wall. This holds the ledger securely in position.

Prior to the ledger being held against the wall, a plurality of holes are drilled through the wall. Typically the wall is formed from masonry and more particularly formed from cinder blocks. The holes are placed in the masonry to face the ledger. Holes are also placed in the ledger. Anchor bolts which are substantially L-shaped (having one long leg and a short leg at right angles thereto) are led through the ledger. Specifically, a threaded free end of the long leg extends through the ledger and receives a washer and bolt. The short leg of the anchor bolt (and an adjacent part of the long leg) is then placed through the hole in the wall. The ledger is held to the wall by the clamping backing device. The masonry wall is then filled with cementitious material, typically grout which fixes the short end of the anchor bolt and a portion of the long end therewithin. After the grout hardens, the nuts threaded onto ends of the long leg of the anchor bolts are tightened to hold the ledger tightly to the wall. Subsequently, the ledger bracket is removed by removing screws which held the plate to the wall and the ledger is thereafter ready for use.

OBJECTS OF THE INVENTION

Accordingly, it is a primary object of the present invention to provide a new and novel device for installing ledgers.

A further object of the present invention is to provide a method for installing a ledger relying on the device as set forth herein.

A further object of the present invention is to provide a device as characterized above which is extremely safe to use and free from the inefficiencies which have afflicted the prior art.

A further object of the present invention is to provide a device as characterized above which lends itself to mass production techniques.

Viewed from a first vantage point, it is an object of the present invention to provide a support for a ledger, comprising, in combination: a plate having means for attachment to a wall; a shelf orthogonally projecting from the plate dimensioned to receive a portion of the ledger thereon; and clamp means on the support to hold and release the ledger against the wall.

Viewed from a second vantage point, it is an object of the present invention to provide a method for installing a ledger on a wall, the steps including: installing a temporary ledger support on the wall; drilling holes in the ledger; drilling holes in the wall aligned with the ledger holes; placing anchor bolts in the ledger holes; placing the ledger on the ledger support; aligning the anchor bolts through the ledger holes; cementing the anchor bolts into the wall; and removing the ledger support.

These and other objects will be made manifest when considering the following detailed specification when taken in conjunction with the appended drawing figures.

DESCRIPTION OF PREFERRED EMBODIMENTS

Figure 1:
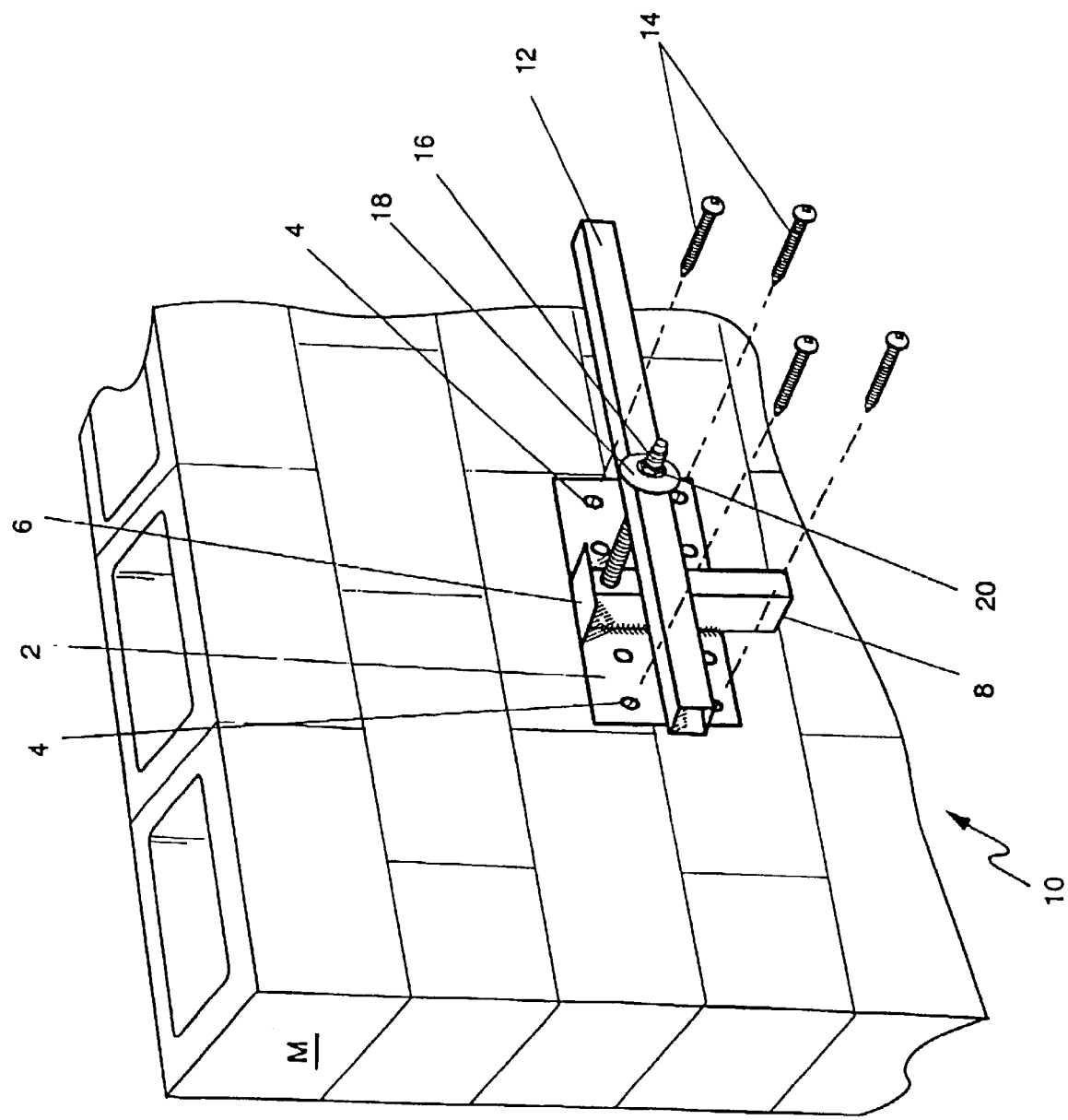
FIG. 1 is a perspective view of the apparatus according to the present invention in an early stage of deployment.

Considering the drawings, wherein like reference numerals denote like parts throughout the various drawing figures, reference numeral 10 is directed to the ledger support bracket according to the present invention.

In its essence, the support 10 for a ledger L includes a plate 2 attached to a masonry wall M, and a shelf 6 is provided extending from the plate to support the leedger thereon. In addition, a clamping means is operatively coupled to the support 10 which allows the ledger to be held against the wall.

More specifically, the plate 2 is of substantially rectangular configuration and has a plurality of holes 4 passing therethrough. In a preferred embodiment, plate 2 has a width substantially twice the dimension of its height and the holes 4 are placed in a pattern such that four holes are placed to the left side of the plate and four holes are placed to the right side, each in a square pattern. A plurality of screws 14 are removably placed through the holes 4 for attachment to a masonry wall M as shown in FIG. 1.

FIG. 1 also shows a shelf 6 projecting away from the masonry wall M and attached to a top edge of the plate 2. Preferably the shelf 6 is medially disposed along the top edge of the plate 2 and projected at a 90° angle away from the wall for purposes to be assigned. The shelf 6 is supported on a bottom face thereof by means of a box beam 8 of substantially square cross-section welded to an underside of the shelf 6 and to a face of the plate 2 remote from the wall M. Thus, shelf 6 can support the ledger L shown in FIGS. 2 through 4 with a high degree of strength and reliability.

Box beam 8 also supports a threaded shaft 16 projecting perpendicularly from the masonry wall M and just below the shelf 6. Threaded shaft 16 passes through and is attached to the box beam 8 in a reliable and secure manner and a free end of the shaft 16 has exposed threads to receive a tightening nut 20 thereon and a washer 18 which distributes force. The washer 18 presses against clamp means 12, configured as a length of box beam which, as shown in FIG. 3, can pivot along the direction of the double ended arrow "R" so that in the FIG. 3 position the ledger L is held against the masonry wall M and in the FIG. 2 configuration, the clamp 12 underlies and is parallel to the ledger L to allow the ledger to be freely placed on the shelf 6.

Figure 2:
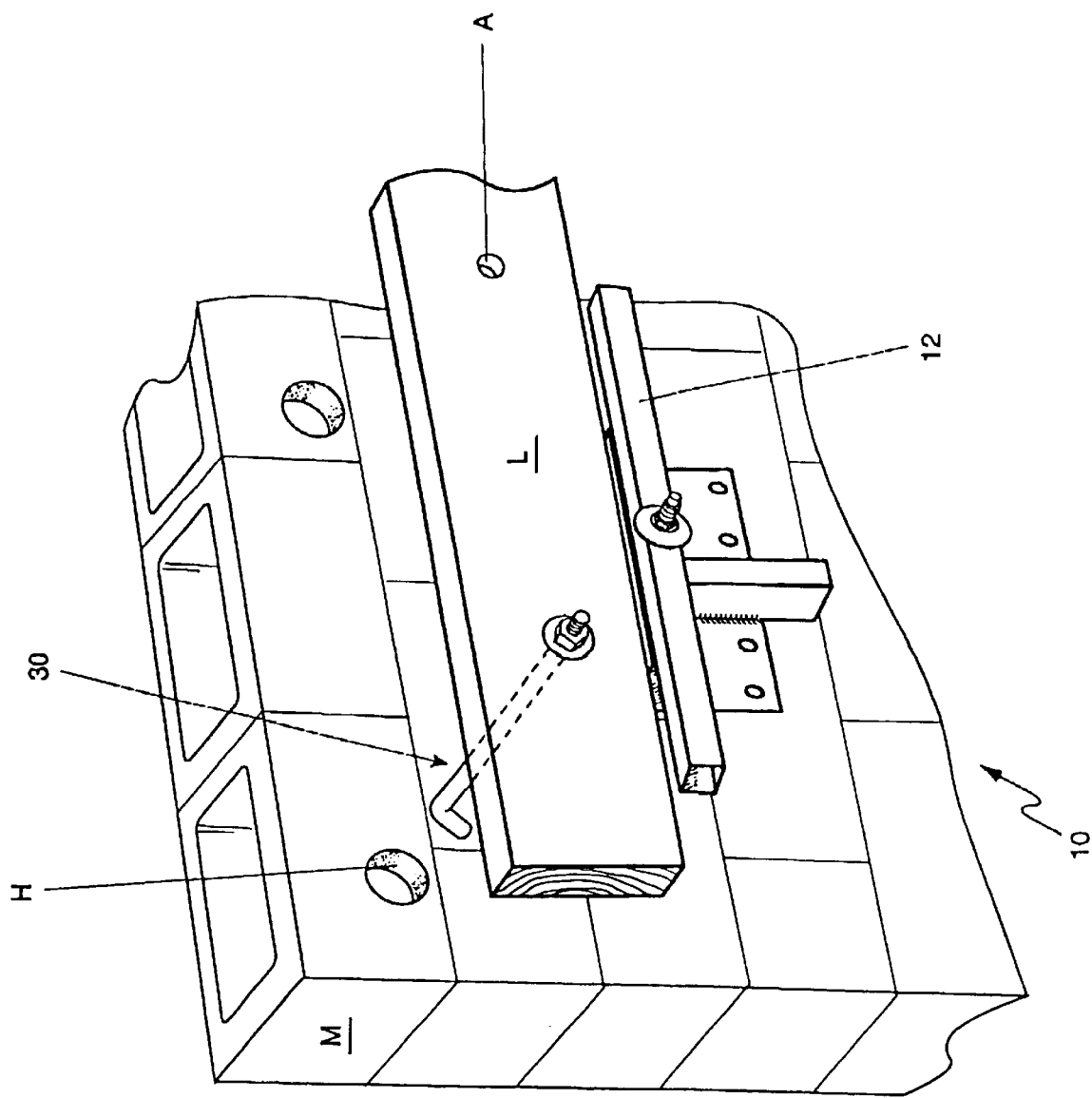
FIG. 2 is a similar view in a second more advanced stage of deployment.
Figure 3:
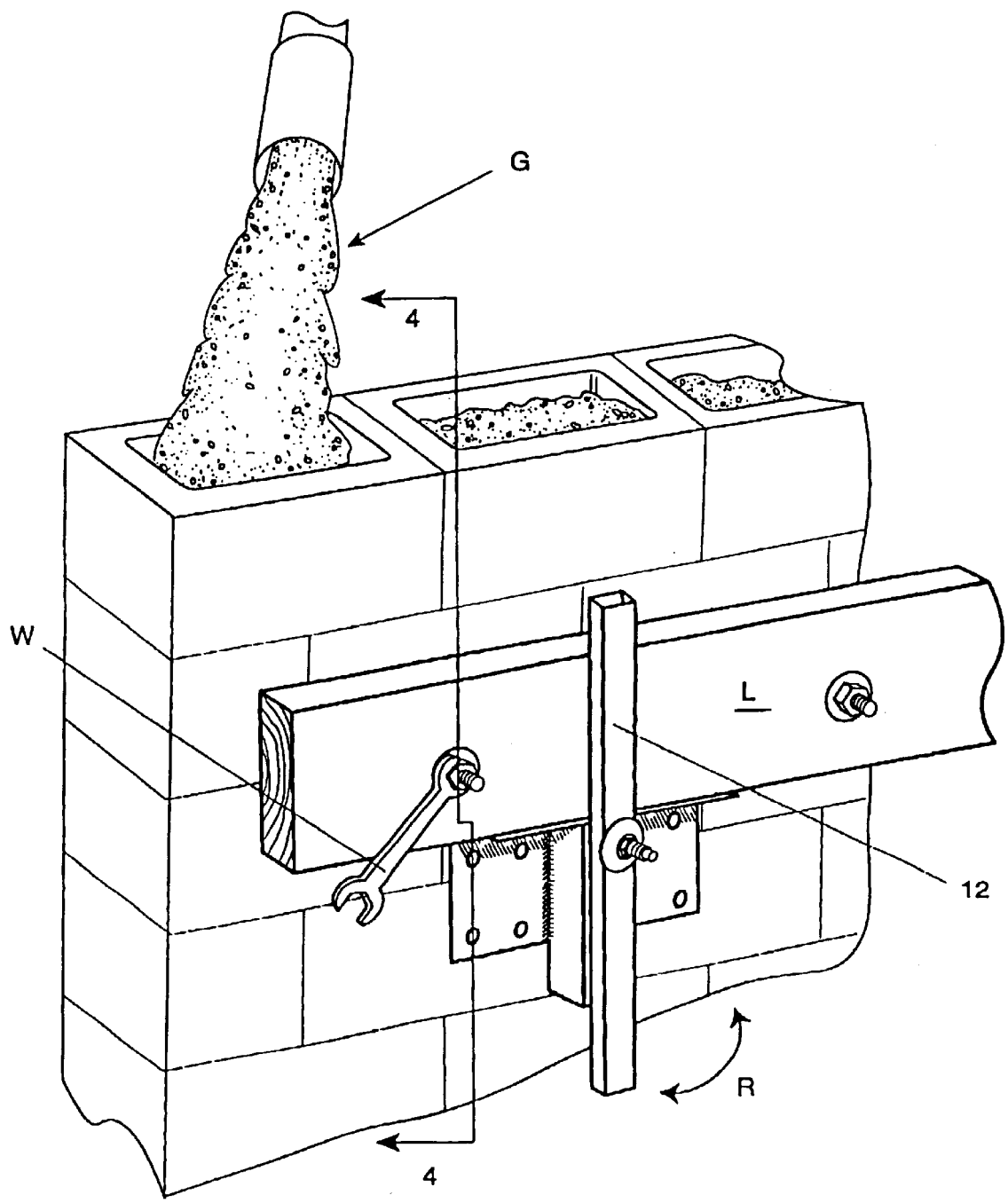
FIG. 3 is a third even more advanced view in a further stage of deployment.
Figure 4:
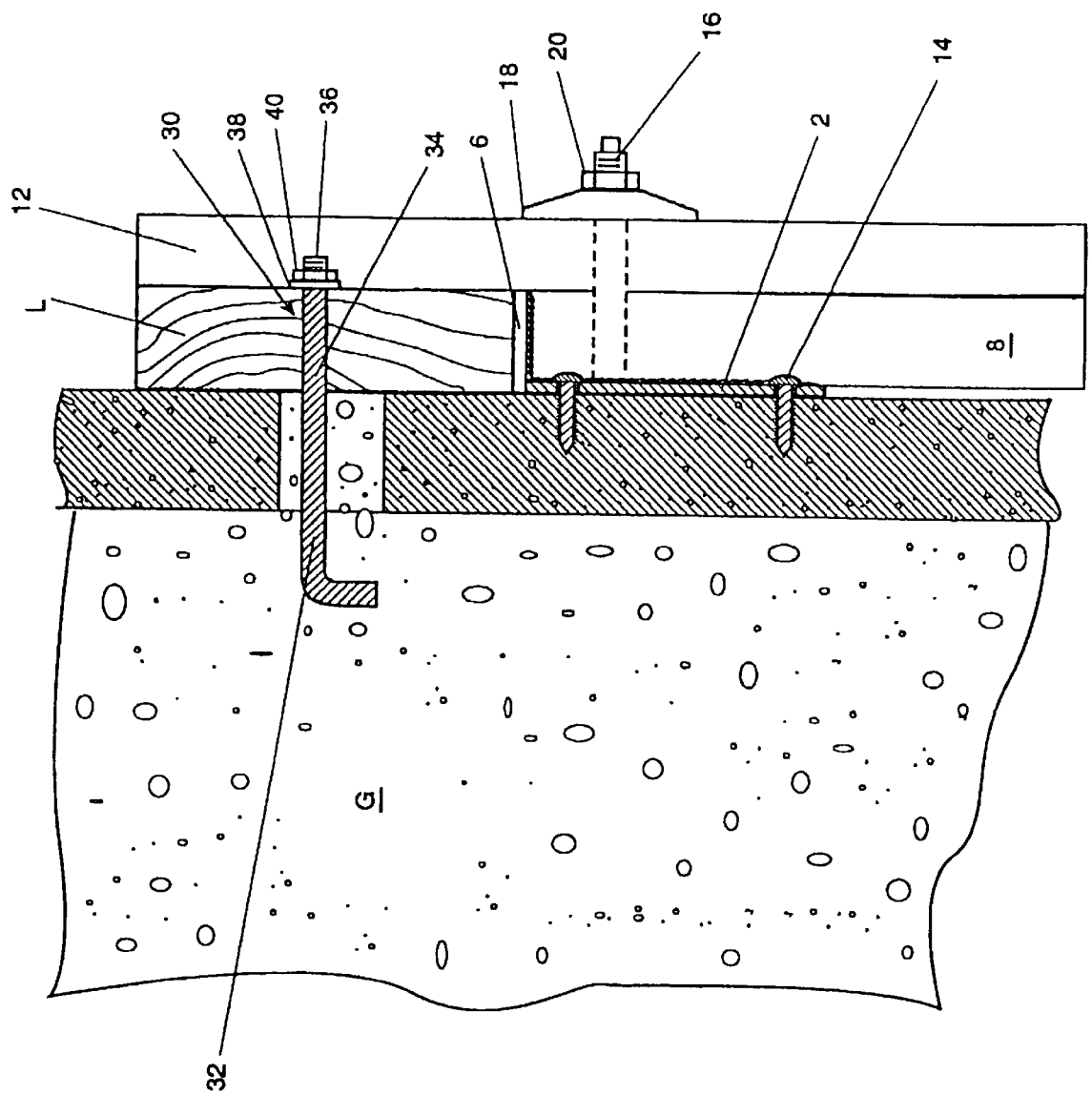
FIG. 4 is a sectional view showing the effects of the deployment.

Assume that the ledger L has been placed on the shelf 6 as shown in FIG. 2, the clamp means, shown in FIG. 2 is then rotated in the direction of the arrow "R" in a counter clockwise manner to be oriented perpendicular to the long axis of the ledger L. Subsequently, the nut 20 is tightened on the threaded shaft 16 causing the washer 18 to press against the clamp 12 holding the ledger L firmly against the wall as shown in FIG. 4.

In use and operation, the plate 2 is fastened to the wall M as shown in FIG. 1 via the screws 14. Next, a plurality of holes H are placed along the length of the wall M to correspond with apertures A drilled into the ledger L as shown in FIG. 2. Next, anchor bolts 30 are oriented to each pass through a hole H such that a short leg 32 of the anchor bolt is ensconced within the masonry wall M and a long leg 34 passes through the ledger L projecting outwardly therefrom, exposing thread 36 which is to receive a nut 40 thereon with an interposed washer 38 placed between the ledger L and the nut 40, as shown in Figure. 4. It is preferred that the anchor bolt washer 38 and nuts 40 be attached to the thread 36 of the anchor bolt 30 prior to placing the ledger L on the device 10. Referring to FIG. 3, once the ledger L is held in fixed position by means of the clamp 12 being deployed in the FIG. 3 and FIG. 4 position, grout G fills hollows within the masonry wall M. Should the grout G dislodge the anchor bolts 30, the bolts 30 can be pushed back in.

This device works well with cinder block so that once the grout G or other cementitious material is placed within the hollows of the cinder block, the anchor bolt 30 is fixed to the wall by means of the short leg 32 of the anchor bolt being embedded along with an adjacent portion of the longer leg 34. Once the cementitious material has set up (hardened), the nuts 40 can be tightened and the clamp 12 can be rotated so that it is substantially parallel to the ledger as shown in FIG. 2. The support 10 can be removed by the extraction of the screws in a procedure the reverse of that which was described and shown with respect to FIG. 1. The support can then be used for another ledger. Although one ledger support bracket has been shown in the drawings, it should be evident that a plurality of supports could be deployed along the length of the ledger as is desired for stability.

Moreover, having thus described the invention, it should be apparent that numerous structural modifications and adaptations may be resorted to without departing from the scope and fair meaning of the instant invention as set forth hereinabove and as described hereinbelow by the claims.

I claim:

1. A removable support for permanently affixing a ledger, after which said support may be removed, comprising, in combination:

a plate having means for removable attachment to a wall;

a shelf orthogonally projecting from said plate dimensioned to temporarily receive a portion of the ledger thereon;

and clamp means on said support to temporarily hold the ledger against the wall while the ledger is being fastened to the wall.

2. The support of claim 1 wherein said clamp means includes a bar pivotally connected to said support and adapted to be moved from a first position parallel to a ledger and second position perpendicular to the ledger, forcing the ledger against the wall.

3. A method for installing a ledger on a wall, the steps including:

installing a temporary ledger support on the wall;
   drilling holes in the ledger;
   drilling holes in the wall aligned with the ledger holes;
   placing anchor bolts in the ledger holes;
   placing the ledger on the ledger support;
   aligning the anchor bolts through the wall holes;
   cementing the anchor bolts into the wall;
   and removing the ledger support.

4. The method of claim 3 including placing nuts on the anchor bolts after placement into the ledger holes.

5. An apparatus for temporarily locating a ledger to be permanently affixed to a wall, comprising, in combination:

attachment means removably attached to the wall;
   a ledger support operatively coupled to said attachment means, presenting the ledger in face to face registry with the wall; and means for releaseably holding the ledger against the wall, connected to said apparatus, whereby said apparatus may be removed after the ledger is permanently affixed to the wall.

6. A static structure, comprising, in combination:

a support for a ledger; and attachment means on said support, whereby said support may be removed after the ledger is permanently affixed to a wall without removing the ledger from the wall.

7. The structure of claim 6 further including means for securing the ledger against the wall, wherein said means for securing may be removed after the ledger is permanently affixed to a wall.

8. A method for installing a ledger on a wall, the steps including:

installing a temporary ledger support on the wall;
   placing the ledger on the ledger support;
   affixing the ledger to the wall in a permanent fashion; and
   removing the ledger support.

9. A method for installing a ledger on a wall, the steps including:

installing a temporary ledger support on the wall;
   placing the ledger on the ledger support;
   temporarily securing the ledger against the wall;
   affixing the ledger to the wall in a permanent fashion; and
   removing the ledger support.

10. A static structure, comprising, in combination:

support means for a ledger;

attachment means operatively coupled to said support means, such that said support is removably attached to a wall; and securing means operatively coupled to said support means, whereby said securing means removably engages a side of the ledger opposite the wall.

11. A support for temporarily holding a ledger against a wall for facilitating permanent attachment of the ledger to the wall, comprising, in combination:

a plate adapted for removeable attachment to the wall;

a shelf projecting from said plate dimensioned to receive a portion of the ledger and allow the ledger to abut against the wall for permanent fastening thereto;

a clamping means operatively coupled to said support and having two positions: a first position which allows the ledger access to said shelf and a second position which holds the ledger on said shelf and against the wall;

whereby once the support is attached to the wall, the ledger is temporarily supported by the support until the ledger can be permanently affixed to the wall.

12. The support of claim 11 wherein said shelf is attached to a top edge of said plate at a right angle to said plate.

13. The support of claim 11 wherein said shelf is supported by a beam fixed between said shelf and said plate.

14. The support of claim 13 wherein said beam is a box-shaped beam.

15. The support of claim 14 wherein said shelf is substantially planar and said beam has a long axis perpendicular to the plane of said shelf.

16. The support of claim 13 wherein a threaded shaft is supported on said beam and said clamping means rotates about said threaded shaft.

17. The support of claim 16 wherein said clamping means is an elongate beam.

18. The support of claim 11 wherein said clamping means is pivotally connected to said support via a threaded shaft.

* * * * *